(12) United States Patent
Shet

(10) Patent No.: US 11,884,241 B2
(45) Date of Patent: Jan. 30, 2024

(54) STORAGE BIN FOR USE IN A VEHICLE

(71) Applicant: Volvo Truck Corporation, Gothenburg (SE)

(72) Inventor: Rajesh Shet, Bangalore (IN)

(73) Assignee: Volvo Truck Corporation, Gothenburg (SE)

( * ) Notice: Subject to any disclaimer, the term of this patent is extended or adjusted under 35 U.S.C. 154(b) by 601 days.

(21) Appl. No.: 17/251,461

(22) PCT Filed: Jun. 12, 2019

(86) PCT No.: PCT/EP2019/065282
§ 371 (c)(1),
(2) Date: Dec. 11, 2020

(87) PCT Pub. No.: WO2019/238719
PCT Pub. Date: Dec. 19, 2019

(65) Prior Publication Data
US 2021/0253031 A1 Aug. 19, 2021

(30) Foreign Application Priority Data
Jun. 14, 2018 (IN) .............................. 201841022365

(51) Int. Cl.
*B60R 7/04* (2006.01)
(52) U.S. Cl.
CPC ..................................... *B60R 7/04* (2013.01)
(58) Field of Classification Search
CPC ............... B60R 7/04; B60R 2011/0003; B60R 2011/0005; B60R 2011/0019; B60R 2011/0028; B64D 11/003
See application file for complete search history.

(56) References Cited

U.S. PATENT DOCUMENTS 2,254,861 A * 9/1941 Visser .................... B60N 3/083
296/37.9
8,528,956 B1 * 9/2013 Winiger .................. B60R 11/02
296/37.8

(Continued)

FOREIGN PATENT DOCUMENTS

CN 1847055 A 10/2006
CN 202656943 U 1/2013

(Continued)

OTHER PUBLICATIONS

International Search Report and Written Opinion for PCT/EP2018/065282, dated Aug. 20, 2019, 13 pages.

(Continued)

*Primary Examiner* — Amy R Weisberg
*Assistant Examiner* — Sara Laghlam
(74) *Attorney, Agent, or Firm* — Withrow & Terranova, PLLC

(57) ABSTRACT

A storage bin assembly (1) comprises a storage bin (2) and a retainer (3). The storage bin is retained by the retainer and is movable in relation to the retainer. The storage bin comprises a first guiding pin (5) arranged at, and protruding from a first bin side wall (2a) in a width direction of the storage bin assembly. The retainer comprises a first guiding track (4) arranged in a first retainer side wall (3a). The first guiding pin is slidably arranged in the first guiding track (4). The first guiding pin (5) is arranged to move in the width direction when moving the storage bin between a first position with the first guiding pin located at a first end (4') of the first guiding track and a second position with the first guiding pin located at a second end (4") of the first guiding track.

15 Claims, 5 Drawing Sheets

(56) References Cited

U.S. PATENT DOCUMENTS

| | | | |
|---|---|---|---|
| 2005/0134074 A1* | 6/2005 | Youngs | B60R 7/081 296/37.13 |
| 2009/0001112 A1* | 1/2009 | Chou | B60R 7/06 224/400 |
| 2017/0341586 A1 | 11/2017 | Wang | |
| 2021/0034100 A1* | 2/2021 | Lesuffleur | G02F 1/133308 |
| 2023/0114092 A1* | 4/2023 | Nakaoka | B60R 16/0215 296/37.12 |
| 2023/0129974 A1* | 4/2023 | Park | B60R 21/045 280/752 |
| 2023/0278502 A1* | 9/2023 | Toriumi | E05C 9/043 292/216 |

FOREIGN PATENT DOCUMENTS

| | | |
|---|---|---|
| CN | 103879357 A | 6/2014 |
| CN | 204077531 U | 1/2015 |
| CN | 104563682 A | 4/2015 |
| CN | 205417192 U | 8/2016 |
| EP | 0721585 A1 | 7/1996 |
| EP | 0721858 A1 | 7/1996 |
| JP | 2006111160 A | 4/2006 |

OTHER PUBLICATIONS

First Office Action for Chinese Patent Application No. 201980038712.3, dated Aug. 25, 2023, 16 pages.

* cited by examiner

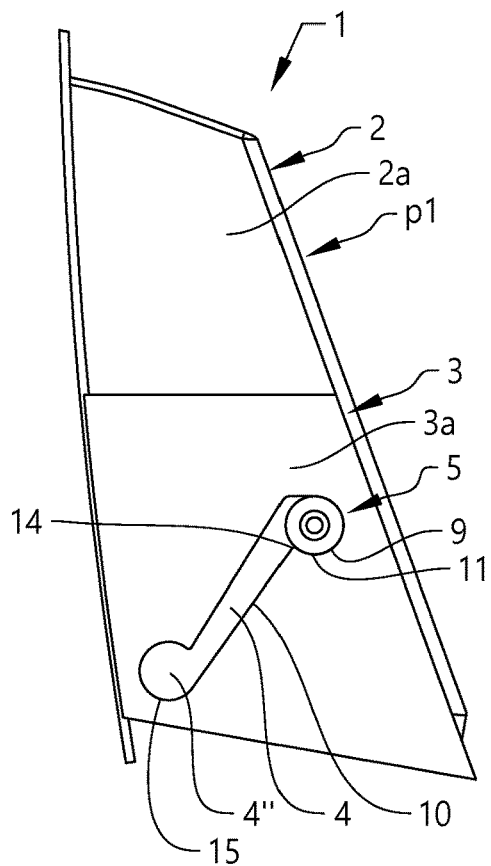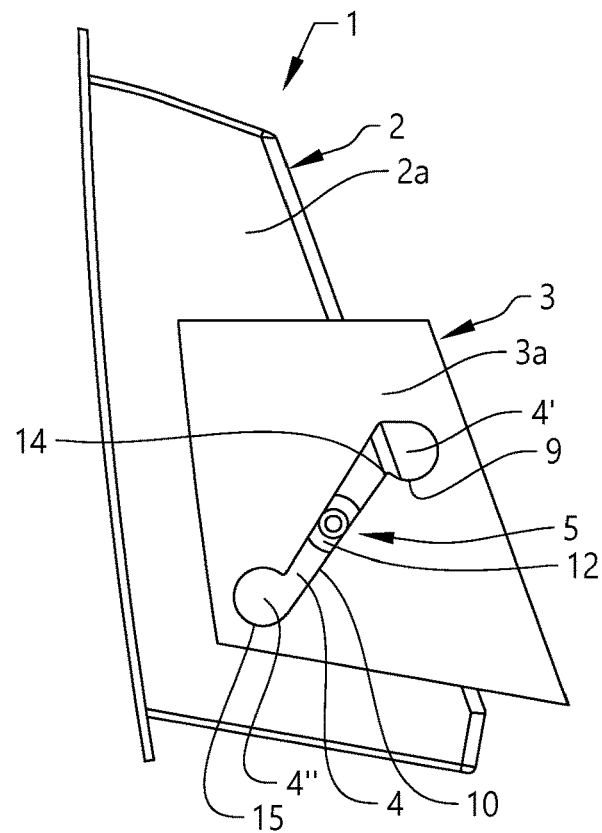
FIG. 6a  FIG. 6b
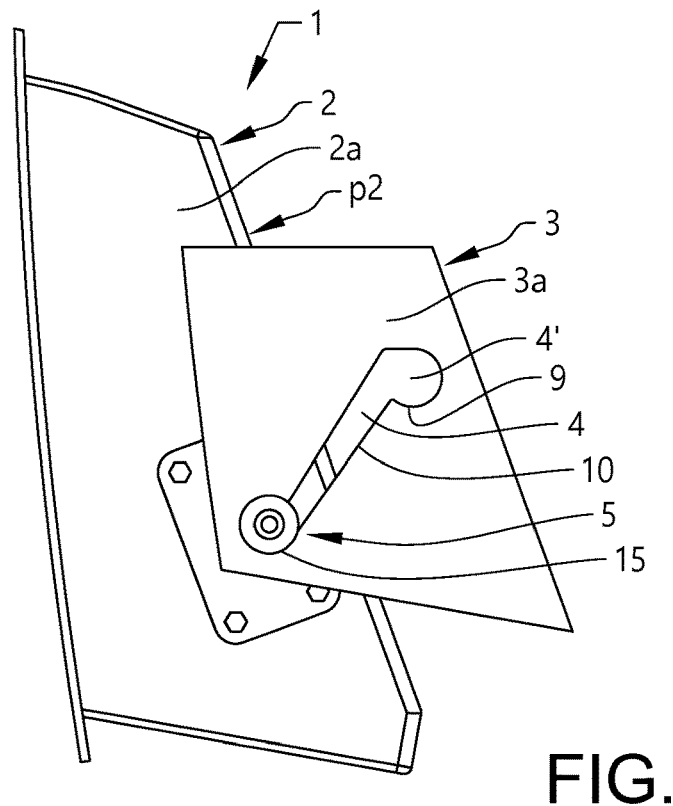
FIG. 6c

STORAGE BIN FOR USE IN A VEHICLE

This application is a 35 USC 371 national phase filing of International Application No. PCT/EP2019/065282, filed Jun. 12, 2019, which claims priority to Indian patent application no. 201841022365, filed Jun. 14, 2018, the disclosures of which are incorporated herein by reference in their entireties.

TECHNICAL FIELD

The invention relates to a storage bin assembly for use in a vehicle. More specifically, the invention relates to a storage bin assembly comprising a storage bin and a retainer.

The invention can be applied in heavy-duty vehicles, such as trucks, buses, boats, airplanes and construction equipment.

BACKGROUND

Trucks and other vehicles have a need for storage compartments for storing items in the cabin. However, as the space in many cabins is limited, the storage compartments may be arranged higher up in the cabin, such as above the seats and at the level of the ceiling. Such arrangements are practical as they are arranged at a location which is otherwise unused and which does not reduce the adequate space for the driver or passenger to work and move in, thereby maximizing the utilization of the space in the cabin.

Users may however find it difficult to access the storage bin and have a good visibility of the content in an upper storage bin. Hence, such upper storage bin may not be used frequently and space utilization is not efficient. To counter this problem, upper storage bins may be movably arranged, allowing them to be pulled down from a stow-away position to access the content more easily and to then be pushed back up to its initial position. This feature helps achieving efficient space utilization with an improved accessibility and visibility of the content in the storage bin. It also helps to achieve a sense of good cabin space when storage bins are in its stow-away position. The mechanism used in retractable type storage bins such as in aircrafts involves either gas struts or complex links. This complexity leads increases the risk of malfunction, and also leads to an increase in weight and cost of the storage bins and, hence, the overall cost of the vehicle.

SUMMARY

An object of the invention is to provide a storage bin assembly for use in a vehicle, which storage bin assembly allows improved use of vehicle cabin space, and which storage bin assembly has a simple and inexpensive construction yet providing a reliable and smooth opening and closure of the storage bin.

This and other objects may be achieved by a storage bin assembly according to claim 1.

The storage bin assembly for use in a vehicle as disclosed herein comprises, according to a first aspect, a storage bin and a retainer. The storage bin is retained by the retainer and is movable in relation to the retainer. The storage bin comprises first and second bin side walls and the retainer comprises at least a first retainer side wall arranged parallel to the first bin side wall. The storage bin comprises a first guiding pin arranged at, and protruding from the first bin side wall in a width direction of the storage bin assembly. The retainer comprises a first guiding track arranged in the first retainer side wall. The storage bin is connected to the retainer by means of the first guiding pin being inserted into the first guiding track and the first guiding pin is slidably arranged in the first guiding track, whereby the storage bin is movable in relation to the retainer between a first position with the first guiding pin located at a first end of the first guiding track and a second position with the first guiding pin located at a second end of the first guiding track. The first guiding pin is arranged to move in the width direction of the storage bin assembly when moving the storage bin between the first position and the second position.

By the provision of a guiding pin being arranged to move in the width direction when moving the storage bin between the first position and the second position in the first guiding track, the motion of the storage bin may be better controlled and a smooth opening and closure with a less complex construction may be achieved.

The storage bin assembly has a height extending in a height direction, a length extending in a length direction and a width extending in a width direction. The storage bin may further comprise a bin front wall, a bin rear wall, a bin upper wall and a bottom wall. The storage bin front wall may be a storage bin front door. The storage bin may alternatively have an upper opening instead of a bin upper wall.

The retainer may further comprise a second retainer side wall, a retainer rear wall and/or a retainer upper wall. The retainer may for example be a metal retainer.

The first guiding pin of the storage bin may comprise a first shaft. The first shaft comprises a first biasing member arranged at an inner end of the guiding pin. The first biasing member is arranged to exert a biasing force on the first guiding pin in the width direction of the storage bin assembly, wherein a magnitude of the biasing force is changed by moving the storage bin between the first position and the second position. The biasing member may, for example, be a spring. The stiffness of the spring may be adapted for the intended purpose.

The biasing member provides resistance to the compressive force exerted on the guiding pin when the storage bin moves between the first position and the second position thereby decelerating the motion of the guiding pin and rendering the opening and closure smoother. Hence, the storage bin assembly as disclosed herein offers a simple and inexpensive solution for providing controlled movement of a stow-away storage bin.

With the "inner end" of the guiding pin herein is meant the part of guiding pin arranged closest to the storage bin side wall. The "outer end" of the guiding pin is the part of the guiding pin which is opposite the inner end.

In the storage bin assembly as disclosed herein, the biasing member may be arranged to be non-compressed when the storage bin is in the first position, and wherein the guiding pin is adapted to rest on a resting surface when the storage bin is in the first position.

The fact that the biasing member is non-compressed and that the guiding pin is adapted to rest on a resting surface when the storage bin is in the first position provides a stable resting position for the guiding pin when being in the first position. Such configuration may thus prevent inadvertent displacement/opening of the storage bin. The first position of the guiding pin corresponds to a closed position for the storage bin. In order to open the storage bin and to set the guiding pin in motion towards the second end position the user needs to apply a pulling force to the storage bin, such as by means of pulling at a handle, for example arranged on the front wall/front door. It may be sufficient for the user to apply a pulling force which is large enough to overcome the resistance against moving the storage bin out of the rest position. Once dislocated from the rest position, the storage bin may be arranged such that it will glide smoothly down along the guiding track under influence of gravity.

The resting surface may be sunken in relation to an adjacent part of the first guiding track, as seen in a height direction of the storage bin assembly. Therefore, actuation of the guiding pin in at least a vertical direction is required when moving the guiding pin from the resting surface, over the adjacent raised part, towards the second end position. Such configuration provides a resistance to the guiding pin when moving from the first position as a force is needed for lifting the guiding pin slightly upwards from the first sunken position. Thereby, protection against unwanted opening of the storage bin is improved, such as at a sudden braking of the vehicle or irregular speed or rapid movements of the vehicle for example. The guiding track may alternatively be provided a small ridge or knob at the first and/or second end of the guiding track which the guiding pin must pass prior to be positioned in the first and/or second end of the guiding track. The resting surface may thus be arranged as a recess portion as seen in relation to the adjacent part of the first guiding track.

In the storage bin assembly as disclosed herein, the guiding pin may have a resting portion and a guiding portion. The resting portion is arranged closer to the first bin side wall than the guiding portion. The guiding portion has a tapering shape, as seen in a direction from an inner end to an outer end of the shaft. The resting portion of the guiding pin is positioned against the resting surface of the guiding track when the storage bin is arranged in the first position. The guiding portion of the guiding pin is adapted to slide over the guiding surface of the guiding track when the storage bin is moved between the first position and the second position.

The biasing member is preferably non-compressed when the storage bin is in the second position. When the storage bin is in the second position, the guiding pin is, thus, in the second end of the guiding track.

The provision of a storage bin assembly wherein the biasing member is non-compressed when the storage bin is in the second end position provides stability to the storage bin when being in an access position. This facilitates access to and also security of the storage bin.

In the storage bin assembly as disclosed herein, a width of the guiding track may be diminishing in the direction from the first end of the guiding track to the second end of the guiding track. This means that the width between, but not including, the first and second ends of the guiding track diminishes.

The provision of a guiding track having a diminishing width in the direction from the first end of the guiding track to the second end of the guiding track controls the speed of the storage bin during opening of the storage bin, thereby rending the opening smooth.

As disclosed herein, the first end position of the storage bin may be a retracted storage position, and the second end position is an access position, enabling access to an interior of the storage bin.

In the storage bin assembly as disclosed herein, the guiding track may have enlarged end portions providing the first and second end positions.

The provision of enlarged end portion for the guiding track facilitates a non-compressed position for the guiding pin in the end positions and gives stability to the storage bin when positioned in the end positions.

The guiding track may be inclined, as seen in a height direction, from the first end of the guiding track to the second end of the guiding track.

The provision of an inclined guiding track, wherein the inclination is downwards from the first end to the second end of the guiding track gives a higher retracted position of the storage bin when being in the first position and a lower protruding position of the storage bin when being in the second position thus improving the accessibility for overhead storage bin assemblies, being arranged at an upper retracted position closer to the ceiling and increasing the visibility of the content in the storage bin when being in an access position.

According to one embodiment, the guiding track is inclined, as seen in the height direction, with an angle of inclination to the horizontal of from 5 to 85 degrees, such as with an angle of inclination to the horizontal of from 15 to 70 degrees.

According to one embodiment, the storage bin assembly is provided with one or more locking elements which are arranged to lock the storage bin in the first position and/or in the second position. The locking elements may, for example, be in the form of a push-in and spring back button-type, with the storage bin being provided with a spring back button and the retainer wall(s) with an opening allowing the button to enter the opening when the storage bin is in the first and/or second positioned to reversibly lock the position of the storage bin. Alternatively, the storage bin assembly may be provided with a latch locking the guiding pin in position when being position in the first and/or second end of the guiding track.

The provision of locking elements, locking the position of the storage bin when the storage bin is arranged in the first position secures the position of the storage bin when the guiding pin is in the first position and the storage bin is in a closed position. To lock the position of the storage bin when being in the second position may provide more stability when accessing the content of the storage bin. The locking mechanism may be automatic or a user activated locking mechanism. For safety reasons it may be advantageous that at least the upper locking mechanism is automatically activated when moving the storage bin to the retracted position. Thereby it may be avoided that a user forgets to lock the storage bin in the retracted position.

It may be preferred that the retainer comprises a second retainer side wall and a second guiding track, and the storage bin comprises a second guiding pin, being arranged at, and protruding from the second bin side wall in the width direction of the storage bin assembly and wherein the second retainer side wall, the second guiding track and the second guiding pin comprises the features of the first retainer side wall, the first guiding track and the first guiding pin respectively.

According to a second aspect, the present disclosure relates to a vehicle, comprising the storage bin assembly according to the first aspect.

The vehicle may be any type of vehicle in need of an improved storage, such as a truck, a boat, an airplane According to one embodiment the storage bin assembly is arranged adjacent a wall of the vehicle. The wall may be a bottom wall, such as a floor, a side wall or an upper wall, such as a ceiling of the vehicle. An advantage of such arrangement is an improved storage with less impact on the vehicle passenger space, an overhead positioning adjacent the ceiling of the vehicle may be of particular advantage for improving the storage arrangement in the vehicle.

Further advantages and advantageous features of the invention are disclosed in the following description and in the dependent claims.

BRIEF DESCRIPTION OF THE DRAWINGS

With reference to the appended drawings, below follows a more detailed description of embodiments of the invention cited as examples.

In the drawings:

FIGS. 6a-6c show side views of a storage bin assembly according to the present disclosure, going from a first position to a second position.

DETAILED DESCRIPTION OF EXAMPLE EMBODIMENTS OF THE INVENTION

It is to be understood that the drawings are schematic and that individual components are not necessarily drawn to scale. The storage bin assembly, including the storage bin, retainer and the guiding pin shown in the figures are provided as examples only and should not be considered limiting to the invention as disclosed herein. Furthermore, the size and shape of the storage bin assembly may be different from what is shown in the figures. The retainer, storage bin and guiding pin may each have a different size, configuration and shape.

Figure 1:
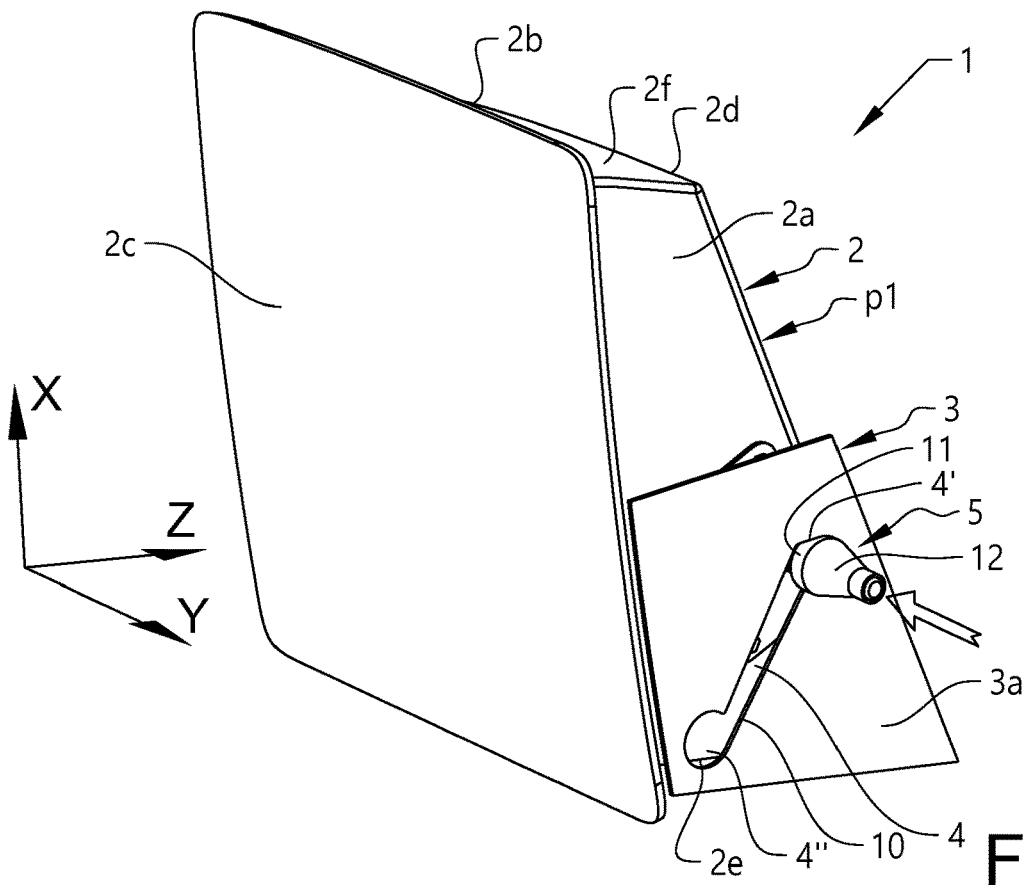
FIGS. 1-5 show perspective views of a storage bin assembly according to the present disclosure, going from a first position to a second position.

With reference to FIG. 1 there is shown a storage bin assembly 1 for use in a vehicle (not shown). The storage bin assembly 1 comprises a storage bin 2 and a retainer 3. The storage bin 2 is retained by the retainer 3 and is movable in relation to the retainer 3. The storage bin assembly has a height extending in a height direction x, a length extending in a length direction z and a width extending in a width direction y. The storage bin 2 comprises first and second bin side walls 2a, 2b, a bin front door 2c, a bin rear wall 2d a bin bottom wall 2e and a bin upper wall 2f. The storage bin 2 is accessed via the bin front door 2c. The retainer 3 comprises at least a first retainer side wall 3a arranged parallel to the first bin side wall 2a. The storage bin 2 comprises a first guiding pin 5 arranged at, and protruding from the first bin side wall 2a in a width direction y of the storage bin assembly 1. The retainer 3 comprises a first guiding track 4 arranged in the first retainer side wall 3a. The first guiding track 4 is inclined, as seen in the height direction z, from the first end 4' of the guiding track 4 to the second end 4" of the guiding track 4 thereby allowing the storage bin to have a lower open and retracted position facilitating access to and visibility of the content in the storage bin via the bin front door 2c.

The storage bin 2 is held in and connected to the retainer 3 by means of the first guiding pin 5 being inserted into the first guiding track 4. The retainer 3 may also comprise a second retainer side wall being parallel to the second bin side wall 2b and a second guiding pin arranged at, and protruding from the second bin side wall 2b in a width direction y of the storage bin assembly 1. The first guiding pin 5 is slidably arranged in the first guiding track 4, whereby the storage bin 2 is movable in relation to the retainer 3 between a first position p1 with the first guiding pin 5 located at a first end 4' of the guiding track 4 and a second position p2 (shown in FIG. 5) with the first guiding pin 5 located at a second end of first guiding track 4. The first guiding pin 5 is arranged to move in the width direction y when moving the storage bin 2 between the first position p1 and the second position p2 (shown in FIG. 5).

The guiding pin 5 has an inner shaft 6 (shown in FIG. 7), a resting portion 11 having a flat surface encircling the guiding pin 5 and a guiding portion 12 having a tapering shape, here a cone-shape, as seen in a direction from an inner end to an outer end of the guiding pin 5. The resting portion 12 of the guiding pin 5 is positioned against the resting surface 9 when the storage bin 2 is arranged in the first position p1.

Figure 2:
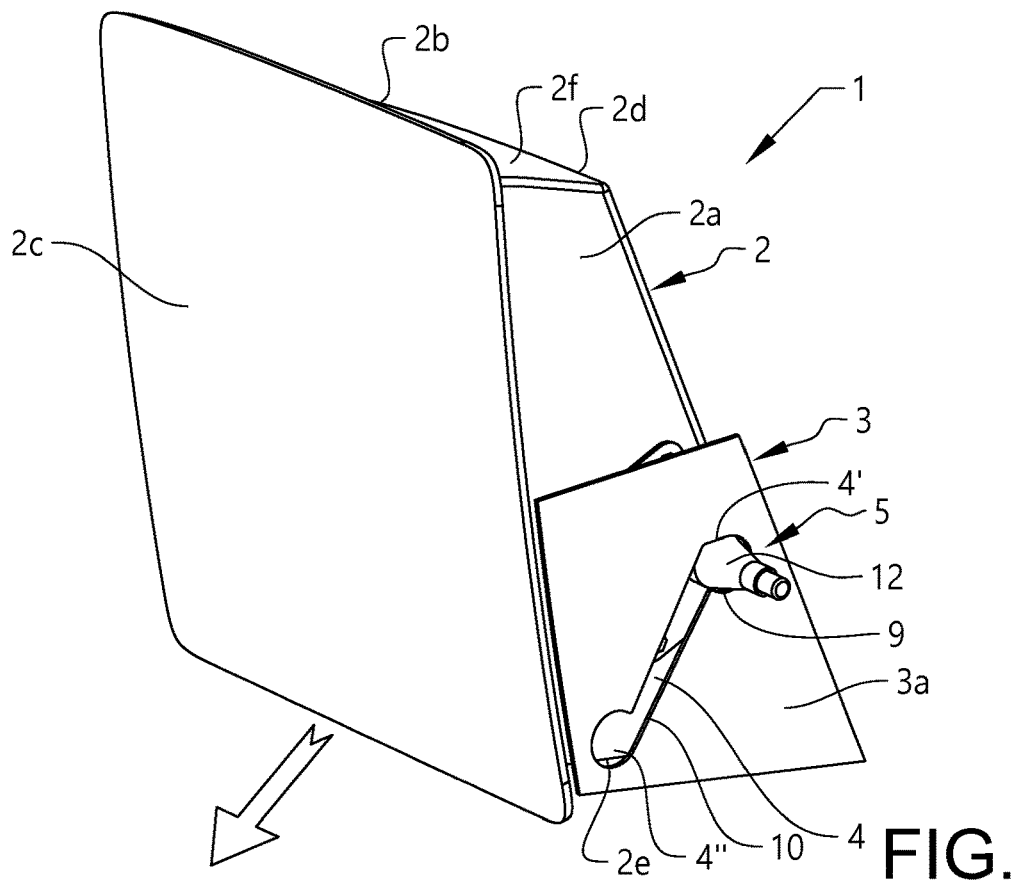

FIG. 2 illustrates a position of the storage bin 2 when the guiding pin 5 is lifted from the first position p1 and the resting surface 9 being sunken surface, as seen in the height direction x, in relation to an adjacent part 14 of the first guiding track 4. Thereby, an actuation of the guiding pin 5 in at least a vertical direction is required when moving the guiding pin 5 from the resting surface 9 towards the second end 4" of the guiding track 4.

As may be seen in FIG. 2, the guiding pin 5 is slightly pressed inwardly towards the storage bin 2 in the width direction, such that the resting portion 11 of the guiding pin 5 no longer is in contact with the resting surface 9 of the first guiding track 4. Instead the guiding portion 12 of the guiding pin 5, being a cone-shaped guiding portion 12 is in contact a guiding surface 12 of the first guiding track 4 when the first guiding pin 5 starts to move from the first end 4' of the first guiding track 4.

Figure 3:
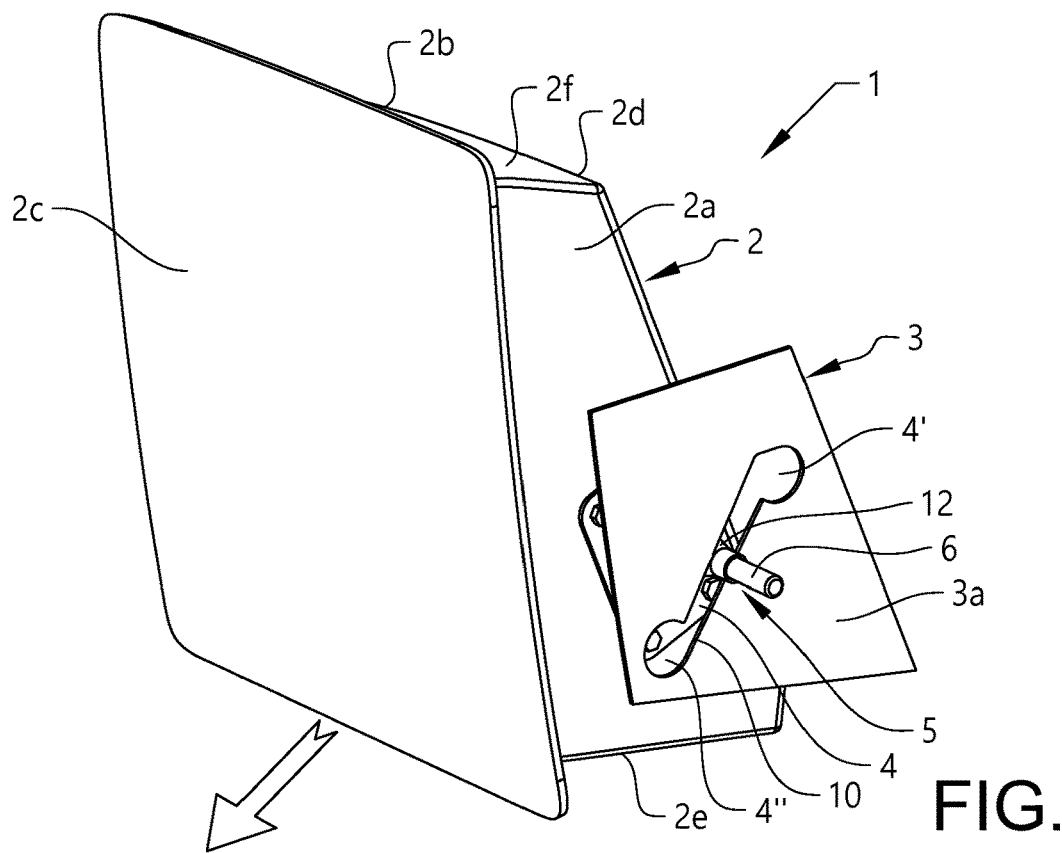

FIG. 3 illustrates the storage bin 2 and the guiding pin 5 when guiding pin 5 is moved between the first end 4' and the second 4" of the first guiding track 4 and the storage bin 2 is moved from a closed first position p1 to an open second position p2. When moved from the resting surface 9 of the first guiding track 4, the guiding pin 5 will due to a diminishing width of the first guiding track 4 be pressed inwardly and the cone-shaped guiding portion 12 with slide on the guiding surface 10 of the first guiding track 4.

Figure 4:
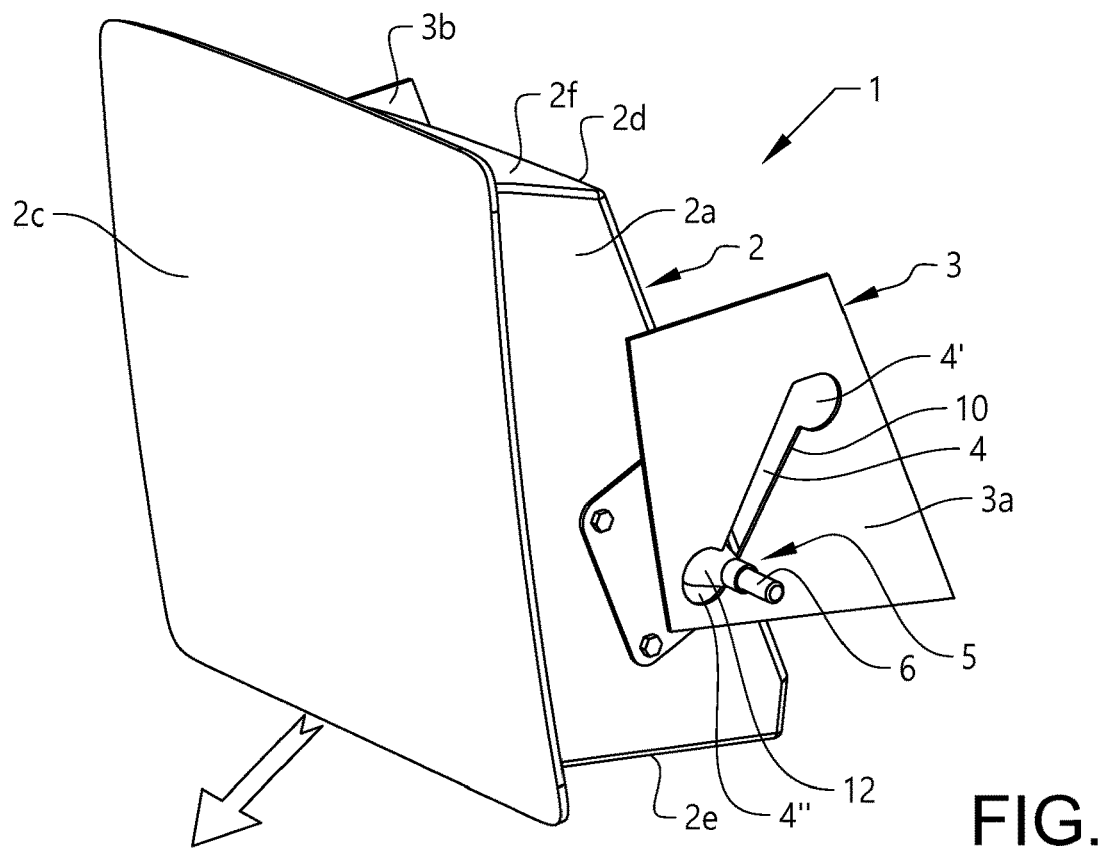
Figure 5:
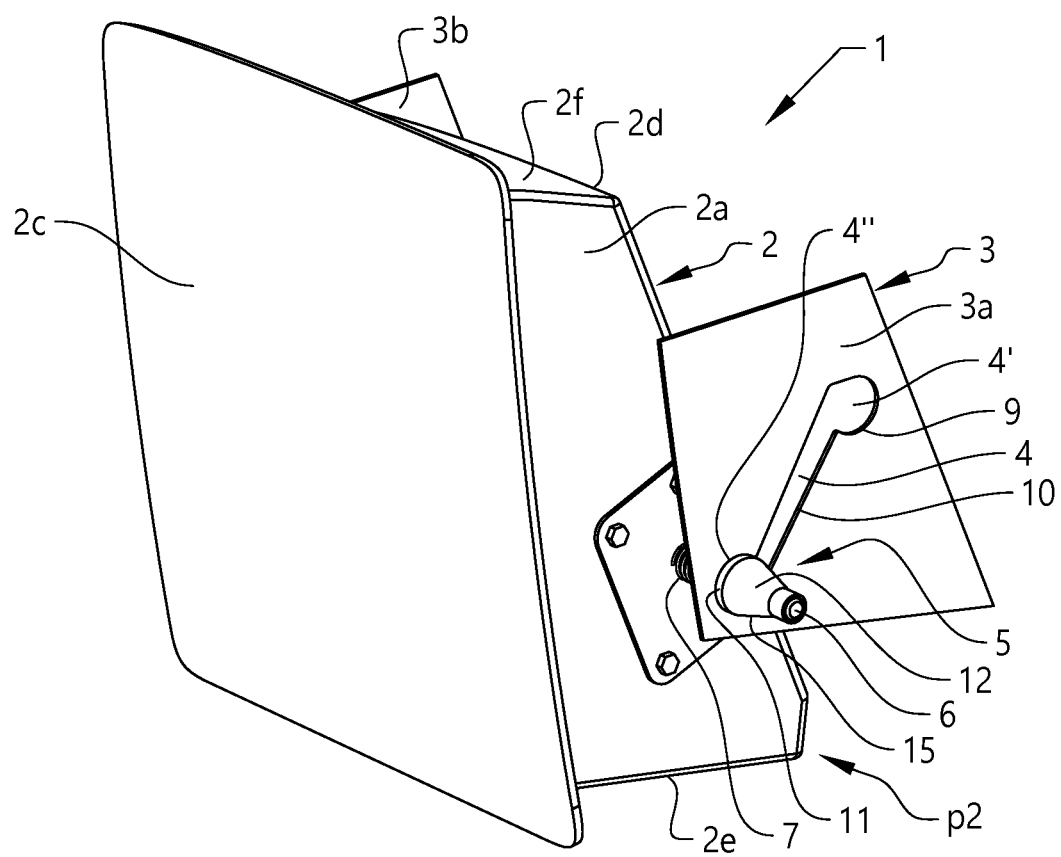

In FIG. 4 the storage bin 2 is almost at its open position p2 and has moved downwardly in relation to the retainer 3. The retainer comprises the first retainer wall 3a and a second retainer wall 3b, being a mirror-image to the first retainer wall 3a. In FIG. 5 the storage bin is in a second access position p2 and the first guiding pin 5 in the second end 4" of the first guiding track 4 resting with its resting portion 11 on a resting surface 15 of the first guiding track 4 and with a first biasing member 7 being non-compressed. The first biasing member 7 is arranged at an inner end of the first shaft 6 and of the first guiding pin 5. The first biasing member 7 is arranged to exert a biasing force on the first guiding pin 5 in the width direction y, such that a magnitude of the biasing force is arranged to change by moving the storage bin 2 between the first position p1 and the second position p2.

FIGS. 6a-6c illustrate the positions of the storage bin 2 moving from position p1 to position p2 and the first guiding pin 5 moving in the first guiding track 4 between a first end 4' of the guiding track 4 to a second end of the guiding track 4". In FIG. 6a, the storage bin 2 is in the first position p1, corresponding to a closed and retracted position of the storage bin 2, and the first guiding pin 5 is positioned in the first end 4' of the guiding track 4 with the resting portion 11 positioned against the sunken resting surface 9 of the guiding track 4. The resting portion 11 of the guiding pin 5 is a plane, i.e. non-inclined, surface positioned at an inner end of the guiding pin 5 compared to the guiding portion 12. When the first guiding pin 5 is position in the first end 4" of the guiding track 4 the first biasing member 7 (shown in FIG. 5) is non-compressed. The guiding pin 5 may be actuated by applying a pulling force, such as pulling in a handle (not shown) arranged on the bin front wall 2c, such that the guiding pin 5 is pulled out from the first end 4' of the guiding track 4 and over the slightly raised adjacent part 14 of the first guiding track 4, as seen in FIG. 6b. While moving between the first end 4' and the second end" of the guiding track 4, the magnitude of the biasing force exerted by the first biasing member 7 on the first guiding pin 5 changes. The first guiding pin 5 is pressed inwardly, due to the decreasing width of the guiding track 4, and the first biasing member 7 applies an opposite force against the first guiding track 4 slowing down the motion of the storage bin 2 and thus providing a deaccelerated and smooth opening of the storage bin 2 to an access positon p2. The second end 4" of the first guiding track 4 has an increased width as compared to the width of along the guiding surface 10 part of the first guiding track 4. When the first guiding pin 5 reaches the second end 4" of the first guiding track 4, the increased width and the biasing force from the first biasing member 7 will press the first guiding pin 5 outwardly and allow the first guiding pin 5 to rest on the resting surface 15 of the guiding track 4 with the resting portion 11 of the first guiding pin 5.

Figure 7:
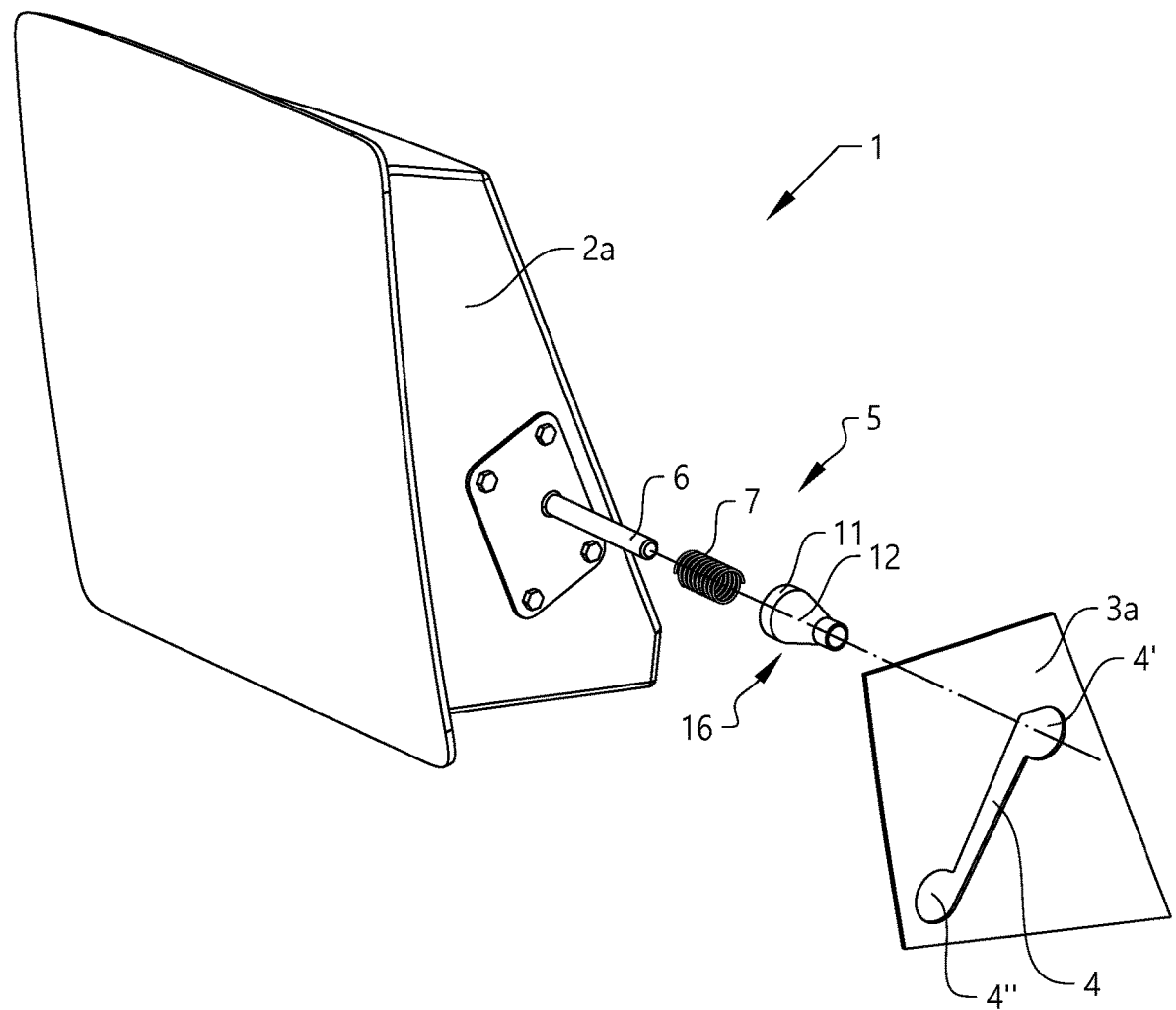
FIG. 7 shows a storage bin assembly with the guiding pin and the retainer wall shown in an exploded view.

FIG. 7 illustrates the storage bin assembly 1 according to FIGS. 1-6, with the first retainer wall 3a and the first guiding pin 5 shown in an exploded view for better visibility of the composition of the guiding pin 5. The first guiding pin 5 thus comprises the first shaft 6 attached to and protruding from the first retainer side wall 2a and the first biasing member 7 arranged at an inner end of the guiding pin 5 and at an inner end of the shaft 6. The biasing member 7 is in this figure in the form of a spring. The first guiding pin 5 further comprises a guiding element 16 comprising a resting portion 11 and a guiding portion 12, the guiding portion 12 having a tapering shape. This cone-shaped guiding element 16 has a through hole, through which the shaft 6 is arranged. The first retainer wall 3a is provided with the inclined first guiding track 4 having a diminishing width between the first and second end 4',4" of the first guiding track 4 and an enlarged width at the first and second ends 4',4" allowing the first guiding pin 5 to partly protrude through the first and/or second ends 4',4" and the biasing member 7 to be non-compressed.

It is to be understood that the present invention is not limited to the embodiments described above and illustrated in the drawings; rather, the skilled person will recognize that many changes and modifications may be made within the scope of the appended claims.

The invention claimed is:

1. A storage bin assembly for use in a vehicle, the storage bin assembly comprising:
    a storage bin comprising first and second bin side walls, the storage bin comprising a first guiding pin arranged at, and protruding from the first bin side wall in a width direction of the storage bin assembly,
    a retainer comprising at least a first retainer side wall arranged parallel to the first bin side wall, the retainer comprising a first guiding track arranged in the first retainer side wall, wherein:
    the storage bin is retained by the retainer and movable in relation to the retainer, the storage bin is connected to the retainer by the first guiding pin being inserted into the first guiding track, the first guiding pin being slidably arranged in the first guiding track, whereby the storage bin is movable in relation to the retainer between a first position with the first guiding pin located at a first end of the first guiding track and a second position with the first guiding pin located at a second end of the first guiding track; and
    the first guiding pin is arranged to move in the width direction of the storage bin assembly when moving the storage bin between the first position and the second position.

2. The storage bin assembly of claim 1, wherein the first guiding pin comprises a first shaft, the first shaft comprising a first biasing member arranged at an inner end of the guiding pin, the first biasing member being arranged to exert a biasing force on the first guiding pin in the width direction of the storage bin assembly, wherein a magnitude of the biasing force is arranged to change by moving the storage bin between the first position and the second position.

3. The storage bin assembly of claim 2,
    wherein:
    the biasing member is non-compressed when the storage bin is in the first position; and
    the guiding pin is configured to rest on a resting surface when the storage bin is in the first position.

4. The storage bin assembly of claim 3, wherein the resting surface is sunken in relation to an adjacent part of the guiding track, as seen in a height direction of the storage bin assembly, such that actuation of the guiding pin in at least a vertical direction is required when moving the guiding pin from the resting surface towards the second end of the guiding track.

5. The storage bin assembly of claim 3, wherein the guiding pin has a resting portion and a guiding porting, the resting portion arranged closer to the first bin side wall than the guiding portion, the guiding portion having a tapering shape as seen in a direction from an inner end to an outer end of the guiding pin, the resting portion being positioned against the resting surface when the storage bin is arranged in the first position, and the guiding portion being adapted to slide over the guiding surface of the guiding track when the storage bin is moved between the first position and the second position.

6. The storage bin assembly claim 2, wherein the biasing member is configured to be non-compressed when the storage bin is in the second position.

7. The storage bin assembly of claim 1, wherein the guiding track has a width, and the width is diminishing in the direction from the first end of the guiding track to the second end of the guiding track.

8. The storage bin assembly of claim 1, wherein the first position is a retracted storage position, and the second end position is an access position, enabling access to an interior of the storage bin.

9. The storage bin assembly of claim 1, wherein the guiding track has enlarged end portions providing the first and second end positions.

10. The storage bin assembly of claim 1, wherein the guiding track is inclined, as seen in a height direction, from the first end of the first guiding track to the second end of the first guiding track.

11. The storage bin assembly of claim 10, wherein the guiding track is inclined, as seen in the height direction, with an angle of inclination to the horizontal from 5 to 85 degrees.

12. The storage bin assembly of claim 1, wherein the storage bin assembly is provided with one or more locking elements which are configured to lock the storage bin in the first position and/or in the second position.

13. The storage bin assembly of claim 1, wherein the retainer comprises a second retainer side wall and a second guiding track, and the storage bin comprises a second guiding pin, arranged at, and protruding from the second bin side wall in the width direction and the second retainer side wall, the second guiding track and the second guiding pin are identical to the first retainer side wall, the first guiding track and the first guiding pin.

14. A vehicle comprising a storage bin assembly, the storage bin assembly comprising:
   a storage bin comprising first and second bin side walls, the storage bin comprising a first guiding pin arranged at, and protruding from the first bin side wall in a width direction of the storage bin assembly,
   a retainer comprising at least a first retainer side wall arranged parallel to the first bin side wall, the retainer comprising a first guiding track arranged in the first retainer side wall, wherein:
   the storage bin is retained by the retainer and movable in relation to the retainer, the storage bin is connected to the retainer by the first guiding pin being inserted into the first guiding track, the first guiding pin being slidably arranged in the first guiding track, whereby the storage bin is movable in relation to the retainer between a first position with the first guiding pin located at a first end of the first guiding track and a second position with the first guiding pin located at a second end of the first guiding track; and
   the first guiding pin is arranged to move in the width direction of the storage bin assembly when moving the storage bin between the first position and the second position.

15. The vehicle according to claim 14, wherein the storage bin assembly is arranged adjacent a wall of the vehicle.

\* \* \* \* \*